(12) United States Patent
Yamazaki et al.

(10) Patent No.: US 12,017,316 B2
(45) Date of Patent: Jun. 25, 2024

(54) CUTTING PROCESSING APPARATUS

(71) Applicant: OMRON Corporation, Kyoto (JP)

(72) Inventors: Yuji Yamazaki, Muko (JP); Katsuji Takeshita, Kyoto (JP)

(73) Assignee: OMRON Corporation, Kyoto (JP)

( * ) Notice: Subject to any disclaimer, the term of this patent is extended or adjusted under 35 U.S.C. 154(b) by 1135 days.

(21) Appl. No.: 16/648,253

(22) PCT Filed: Sep. 26, 2018

(86) PCT No.: PCT/JP2018/035595
§ 371 (c)(1),
(2) Date: Mar. 18, 2020

(87) PCT Pub. No.: WO2019/077948
PCT Pub. Date: Apr. 25, 2019

(65) Prior Publication Data
US 2020/0238402 A1    Jul. 30, 2020

(30) Foreign Application Priority Data

Oct. 17, 2017   (JP) .................................. 2017-200899

(51) Int. Cl.
*B23Q 17/12*    (2006.01)

(52) U.S. Cl.
CPC ........ *B23Q 17/12* (2013.01); *B23Q 2717/006* (2013.01)

(58) Field of Classification Search
CPC ........ B23Q 15/12; B23Q 15/08; B23Q 17/12; B23Q 17/0971; B23Q 2717/006;
(Continued)

(56) References Cited

U.S. PATENT DOCUMENTS 9,498,827 B2 * 11/2016 Sjoo ..................... B23B 25/02
10,525,561 B2 * 1/2020 Ono ..................... B23Q 17/098
(Continued)

FOREIGN PATENT DOCUMENTS

CN     105834835    *   8/2016
CN     106695456    *   5/2017
(Continued)

OTHER PUBLICATIONS

English translation of Wang et al., Cutter abrasion tool, Aug. 10, 2016, p. 13.*
(Continued)

*Primary Examiner* — Alan Snyder
*Assistant Examiner* — Reinaldo A Vargas Del Rio
(74) *Attorney, Agent, or Firm* — METROLEX IP LAW GROUP, PLLC

(57) ABSTRACT

A cutting processing apparatus includes a cutting tool, a chuck portion, a feed mechanism, a fixing portion that fixes the cutting object, a stage that moves the fixing portion at a processing speed in a direction substantially orthogonal to a rotation axis of the chuck portion, a sensor that is arranged in the vicinity of a position on the fixing portion at which the cutting object is fixed, detects vibration of the cutting tool during cutting processing of the cutting object, and outputs a monitoring signal, and a control circuit that converts time waveform data of the monitoring signal to frequency waveform data and extracts an impact amount during cutting processing of the cutting object from the frequency waveform data.

12 Claims, 9 Drawing Sheets

(58) Field of Classification Search
CPC .. B23Q 17/0966; B23Q 17/0976; B23C 3/00; B23C 2260/76; B23B 2260/128; B23B 2260/1285
See application file for complete search history.

(56) References Cited

U.S. PATENT DOCUMENTS

| | | | |
|---|---|---|---|
| 2011/0222980 | A1 | 9/2011 | Kuo et al. |
| 2011/0234147 | A1* | 9/2011 | Iwashita ................ B23Q 15/08 318/799 |
| 2014/0288882 | A1 | 9/2014 | Nakasu et al. |
| 2017/0153208 | A1* | 6/2017 | Kawai .................... G01M 1/30 |

FOREIGN PATENT DOCUMENTS

| | | | |
|---|---|---|---|
| CN | 106695456 | A | 5/2017 |
| EP | 3078452 | A1 * | 10/2016 |
| JP | H6-320398 | A | 11/1994 |
| JP | H06-344246 | A | 12/1994 |
| JP | H11-33882 | A | 2/1999 |
| JP | 2001-30141 | A | 2/2001 |
| JP | 2004-17176 | A | 1/2004 |
| JP | 2014-14914 | A | 1/2014 |
| JP | 5622626 | B2 * | 11/2014 |
| JP | 2015-229216 | A | 12/2015 |
| JP | 2017-094463 | A | 6/2017 |
| JP | 2017-156151 | A | 9/2017 |
| JP | 6501815 | | * 4/2019 |
| WO | 00/73018 | A1 | 12/2000 |
| WO | WO0073018 | | * 12/2000 |
| WO | 2013/031353 | A1 | 3/2013 |
| WO | WO-2013073436 | A1 * | 5/2013 ......... B23Q 11/0028 |

OTHER PUBLICATIONS

English translation of Kawai et al., Cutter abrasion tool, Apr. 4, 2017, p. 20.*
English translation of Chen et al., Cutter detecting device, May 24, 2017, p. 15.*
English translation of Hamaguchi et al., rotational speed display device, Nov. 12, 2014, p. 10.*
Nakasu et al, Translation of Cutting Force Detection Device, pp. 16 (May 23, 2013).*
Barrios et al, Translation of System for Suppresing Chatter in a Machine Tool, pp. 9 (Oct. 12, 2016).*
Chinese Office Action (CNOA) issued on Mar. 31, 2021 in a counterpart Chinese patent application.
Japanese Office Action (JPOA) issued on Mar. 23, 2021 in a counterpart Japanese patent application.
Office Action issued on Sep. 14, 2021 in a counterpart Japanese patent application.
English translation of the International Search Report("ISR") of PCT/JP2018/035595 mailed on Dec. 11, 2018.
Written Opinion("WO") of PCT/JP2018/035595 mailed on Dec. 11, 2018.
Extended European search report (EESR) issued on Jan. 20, 2021 in a counterpart European patent application.

* cited by examiner

FIG. 6

| Measurement location | Main shaft side: Main shaft bottom surface | | | |
|---|---|---|---|---|
| Distance from processing point | About 300 mm | | | |
| Processing vibration frequency | Feeding speed (mm/min) | Processing amount (mm²) | Peak frequency | Vibration strength | Consideration |
| 1670Hz | 800 | 0.0042 | 820Hz | 1000 | A vibration waveform that matches the processing vibration frequency cannot be measured. Vibration at 820 Hz is supposed to be caused by revolutions (50000 rpm = 830 Hz) of the motor. |
| 1670Hz | 800 | 0.00045 | 820Hz | 1000 | |

CUTTING PROCESSING APPARATUS

TECHNICAL FIELD

The present invention relates to a cutting processing apparatus.

RELATED ART

For example, JP 2014-14914A (Patent Document 1) discloses a cutting processing apparatus. The cutting processing apparatus includes a sensor that detects a monitoring signal for obtaining an impact amount of a multi-blade cutting tool during cutting processing, a data conversion means that obtains frequency domain waveform data from time domain waveform data of the monitoring signal, and an impact amount extraction means that extracts, from the obtained frequency domain waveform data, a monitoring signal at a frequency relating to a product of the number of revolutions of the multi-blade cutting tool and the number of cutting edges as an impact amount that correlates with cutting resistance.

RELATED ART DOCUMENTS

Patent Documents

Patent Document 1: JP 2014-14914A

SUMMARY OF THE INVENTION

Problem to be Solved by the Invention

JP 2014-14914A discloses a steel pipe (made of stainless steel (rolled steel for ordinary structures), for example) as a cutting object, but does not disclose other materials of the cutting object. If the material of a cutting object is a metal, such as aluminum or copper, that has a lower degree of hardness than iron, vibration that is transmitted to a main shaft support portion during cutting is small, and accordingly extracting the impact amount may be difficult.

An object of the present invention is to provide a cutting processing apparatus that can reduce effects of the material of a cutting object in extraction of an impact amount during cutting of the cutting object.

Means for Solving the Problems

In one example of the present disclosure, a cutting processing apparatus includes a cutting tool for cutting a cutting object that is made of a material having a lower degree of hardness than stainless steel, a chuck portion configured to hold the cutting tool and be rotationally driven, a fixing portion configured to fix the cutting object, a stage configured to move the fixing portion at a processing speed in a direction that is substantially orthogonal to a rotation axis of the chuck portion, a sensor that is arranged in the vicinity of a position on the fixing portion at which the cutting object is to be fixed, and configured to detect vibration of the cutting tool during cutting processing of the cutting object and output a monitoring signal, and a control circuit configured to convert time waveform data of the monitoring signal to frequency waveform data and extract an impact amount during cutting processing of the cutting object from the frequency waveform data.

With this configuration, it is possible to provide a cutting processing apparatus that can reduce effects of the material of a cutting object in extraction of an impact amount during cutting of the cutting object. The sensor is arranged in the vicinity of a position on the fixing portion at which a cutting object is to be fixed, and therefore, when a cutting object made of a material having a lower degree of hardness than stainless steel is cut, for example, vibration that occurs when the cutting object is cut can be easily detected using the sensor. Therefore, effects of the material of the cutting object can be reduced in extraction of an impact amount during cutting of the cutting object.

The "cutting tool for cutting a cutting object that is made of a material having a lower degree of hardness than stainless steel" may also be a cutting tool that can cut a cutting object that is made of stainless steel or a material having a higher degree of hardness than stainless steel. This description is not intended to limit the cutting tool to a dedicated tool.

In one example of the present disclosure, the sensor is arranged such that a detection direction matches a direction in which the largest cutting resistance occurs.

With this configuration, the sensor can more accurately detect vibration that occurs when the cutting object is cut.

In one example of the present disclosure, the cutting tool includes a plurality of cutting edges. The control circuit extracts the sum total of impact amounts in a frequency range that includes a processing frequency that is determined from a product of the number of revolutions of the cutting tool and the number of cutting edges.

With this configuration, even if the number of revolutions may fluctuate, it is possible to measure impact amounts in a frequency range that is set in consideration of the range of fluctuation. Therefore, the impact amount can be stably measured.

In one example of the present disclosure, the cutting tool includes a plurality of cutting edges. The control circuit extracts the sum total of impact amounts in a frequency range that includes a processing frequency and is set in consideration of fluctuation of the number of revolutions of the cutting tool, the processing frequency being determined from a product of the number of revolutions of the cutting tool and the number of cutting edges.

With this configuration, even if the number of revolutions may fluctuate, it is possible to measure impact amounts in a frequency range that is set in consideration of the range of fluctuation. Therefore, the impact amount can be stably measured.

In one example of the present disclosure, the cutting tool includes a plurality of cutting edges. The control circuit extracts the sum total of impact amounts at a processing frequency and frequencies that are multiples of the processing frequency, the processing frequency being determined from a product of the number of revolutions of the cutting tool and the number of cutting edges.

With this configuration, even if the number of revolutions may fluctuate, the impact amount can be stably measured.

In one example of the present disclosure, the control circuit is configured to control the processing speed of the cutting object based on the impact amount.

With this configuration, it is possible to realize feedback control for varying the processing speed based on the processing resistance. Therefore, processing can be precisely performed.

Effects of the Invention

According to one example of the present disclosure, it is possible to provide a cutting processing apparatus that can reduce effects of the material of a cutting object in extraction of an impact amount during cutting of the cutting object.

BRIEF DESCRIPTION OF THE DRAWINGS

FIG. 6 is a diagram showing a table that shows a measurement result of an impact amount in a case in which a sensor is arranged in contact with an upper surface of a main shaft support portion and a side surface of a main shaft motor.

EMBODIMENTS OF THE INVENTION

§ 1 Application Example

Figure 1:
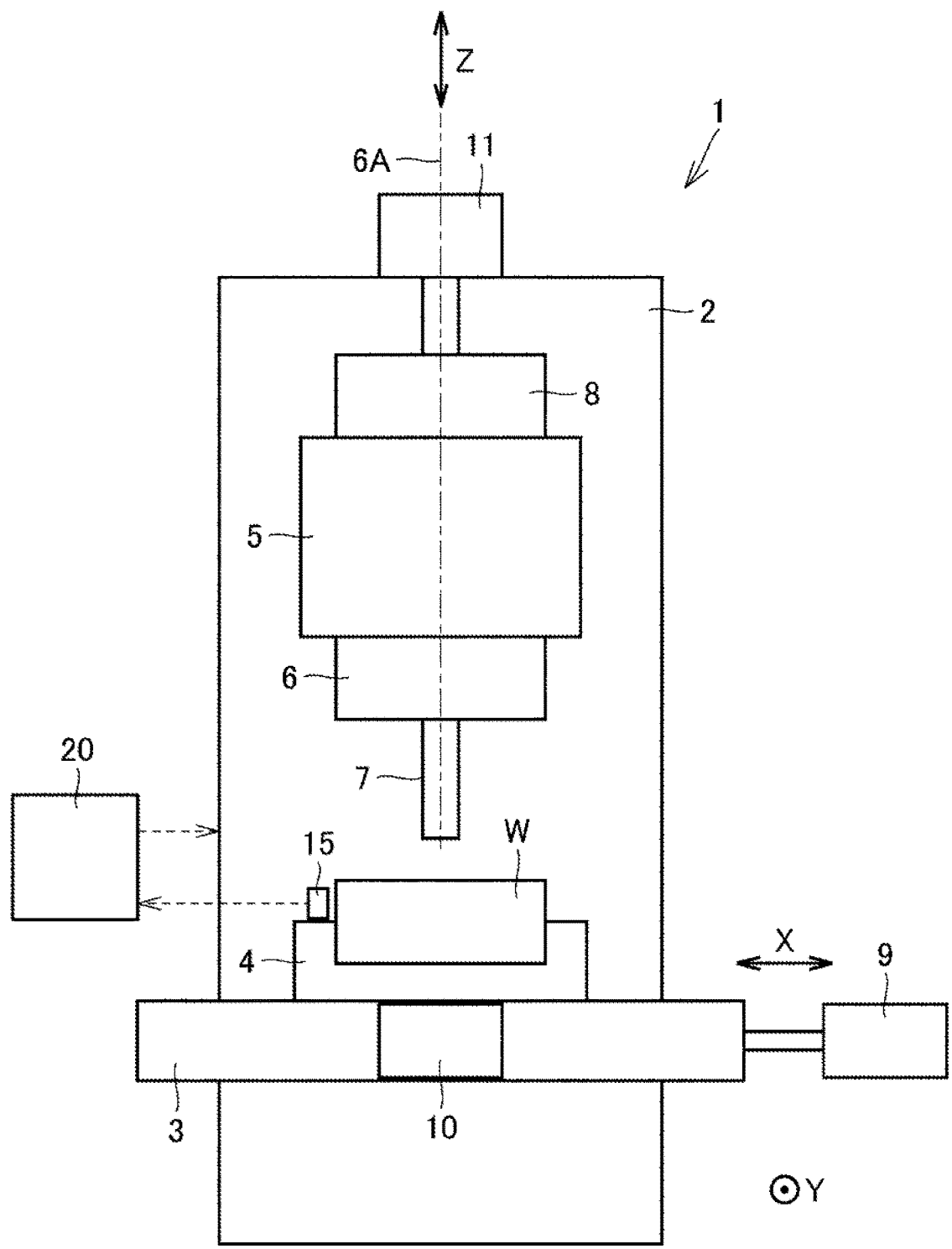
FIG. 1 is a diagram schematically showing one example of a case to which a cutting processing apparatus 1 according to the present embodiment is applied.

First, one example of a case to which the present invention is applied will be described using FIG. 1. FIG. 1 is a diagram schematically showing one example of a case to which a cutting processing apparatus 1 according to the present embodiment is applied. The cutting processing apparatus 1 according to the present embodiment can reduce effects of the material of a cutting object W in extraction of an impact amount during cutting of the cutting object W, and extract the impact amount based on a monitoring signal output from a sensor 15 when the cutting object W, which is made of a material having a lower degree of hardness than stainless steel (rolled steel for ordinary structures), is cut.

As shown in FIG. 1, the cutting processing apparatus 1 includes an apparatus main body 2, a stage 3, a fixing jig 4, a main shaft support portion 5, a chuck portion 6, a cutting tool 7, a main shaft motor 8, an X axis feed mechanism 9, a Y axis feed mechanism 10, a Z axis feed mechanism 11, a sensor 15, and a control apparatus 20. The cutting tool 7 is for cutting a cutting object W that is made of a material having a lower degree of hardness than stainless steel. The chuck portion 6 holds the cutting tool 7 and is rotationally driven. The Z axis feed mechanism 11 moves the chuck portion 6 in the direction of a rotation axis 6A of the chuck portion 6, i.e., the direction of a Z axis. The fixing jig 4 is for fixing the cutting object W, and is one example of a "fixing portion" in the present invention. The stage 3 moves the fixing jig 4 at a processing speed in a direction (X axis direction or Y axis direction) that is substantially orthogonal to the rotation axis 6A of the chuck portion 6. The sensor 15 is arranged in the vicinity of a position on the fixing portion at which the cutting object W is fixed. The sensor 15 detects vibration of the cutting tool 7 during cutting processing of the cutting object W and outputs a monitoring signal. The sensor 15 is arranged such that a detection direction matches the direction in which the largest cutting resistance occurs. The control apparatus 20 is one example of a "control circuit" in the present invention, and converts time waveform data of the monitoring signal output from the sensor 15 to frequency waveform data, and extracts an impact amount during cutting processing of the cutting object W from the frequency waveform data. Note that the cutting tool 7 may also be a cutting tool that can cut a cutting object made of stainless steel or a material having a higher degree of hardness than stainless steel. The sensor 15 is a sensor that detects vibration, e.g., an acceleration sensor.

According to the present embodiment, the sensor 15 is arranged in the vicinity of the position on the fixing portion at which the cutting object W is fixed. Therefore, it is possible to detect only a signal relating to an impact applied to the cutting tool 7 during cutting of the cutting object, while avoiding effects of vibration of a main shaft and the main shaft motor 8. There is a strong correlation between the hardness of a material and the cutting resistance, and the higher the hardness of the material is, the larger the cutting resistance is. If a cutting object made of a material having a lower degree of hardness than stainless steel is cut, the cutting resistance may be small. Accordingly, vibration that occurs when the cutting object is cut is likely to be smaller than vibration that occurs when a cutting object made of stainless steel is cut. However, even in such a case, it is possible to detect only a monitoring signal for obtaining an impact amount of the cutting tool 7 using the sensor 15. Furthermore, the sensor 15 is arranged such that the detection direction matches the direction in which the largest cutting resistance occurs. Therefore, the sensor 15 can detect vibration that occurs when the cutting object W is cut, with a high degree of sensitivity.

§ 2 Configuration Example

The apparatus main body 2 is realized using a machining center, for example. The X axis feed mechanism 9, the Y axis feed mechanism 10, and the Z axis feed mechanism 11 are each constituted by a motor and a ball screw that is coupled to the motor, for example. The stage 3 is supported by the apparatus main body 2 and can be moved in an X direction (left-right direction) using the X axis feed mechanism 9 and in a Y direction (front-back direction) using the Y axis feed mechanism 10. Namely, the stage 3 may be an XY stage that can be moved in two-dimensional directions. The fixing jig 4 is attached to the stage 3, and the cutting object (also called a workpiece) W is fixed to the fixing jig 4.

The cutting object W is made of a material, e.g., copper, aluminum, a copper alloy, an aluminum alloy, etc., that has a lower degree of hardness than stainless steel. According to one embodiment, Vickers hardness (HV) can be used as the above-described "hardness". Vickers hardness of SS400 (about HV120 to 140) can be used as the hardness of stainless steel, for example.

The cutting tool 7 is arranged above the fixing jig 4. The cutting tool 7 is an end mill, for example, and includes a plurality of cutting edges. A shaft portion of the cutting tool 7 is detachably held by the chuck portion 6.

The chuck portion 6 is rotationally driven together with the cutting tool 7 using the main shaft motor 8. The main shaft motor 8 is supported by the main shaft support portion 5. For example, a rail mechanism is attached to the apparatus main body 2, although this is not shown, and the main shaft support portion 5 is supported by the apparatus main body 2 as a result of being supported by the rail mechanism. Furthermore, the main shaft support portion 5 can be moved in a Z direction (up-down direction), i.e., a direction extending along the shaft portion of the cutting tool 7, relative to the apparatus main body 2 using the Z axis feed mechanism 11.

The sensor 15 is attached to the fixing jig 4 and detects vibration that occurs during cutting processing of the cutting object W. The sensor 15 is realized using an acceleration sensor, for example. In the present embodiment, the sensor 15 is arranged such that the direction of sensitivity, i.e., the direction of a sensitivity axis of the sensor 15 matches the direction in which the largest cutting resistance occurs. Therefore, the sensor 15 can detect vibration in the direction in which the largest cutting resistance occurs, with a high degree of sensitivity. The direction in which the largest cutting resistance occurs may vary depending on the shape of the cutting tool. If the cutting tool 7 has the shape shown in FIG. 3 (described later), for example, the direction in which the largest cutting resistance occurs may be the direction of the rotation axis 6A (i.e., Z axis). The sensor 15 detects a monitoring signal for obtaining an impact amount of the cutting tool 7 during cutting processing, and outputs the monitoring signal.

The control apparatus 20 receives the monitoring signal output from the sensor 15, and extracts the impact amount. The impact amount is an amount that correlates with the cutting resistance, and the larger the cutting resistance is, the larger the impact amount is. Furthermore, the control apparatus 20 controls the processing speed of the cutting object W based on the extracted impact amount. The processing speed is equal to a speed at which the cutting object W is moved. The cutting object W is moved in a one-dimensional direction (X axis direction or Y axis direction), for example. The control apparatus 20 controls the feeding speed of the cutting object W in the X axis direction. The control apparatus 20 may also control the feeding speed of the cutting object W in the Y axis direction. The control apparatus 20 may include a CPU (Central Processing Unit), a RAM (Random Access Memory), a ROM (Read Only Memory), etc., for example, and controls constitutional elements according to information processing.

Figure 2:
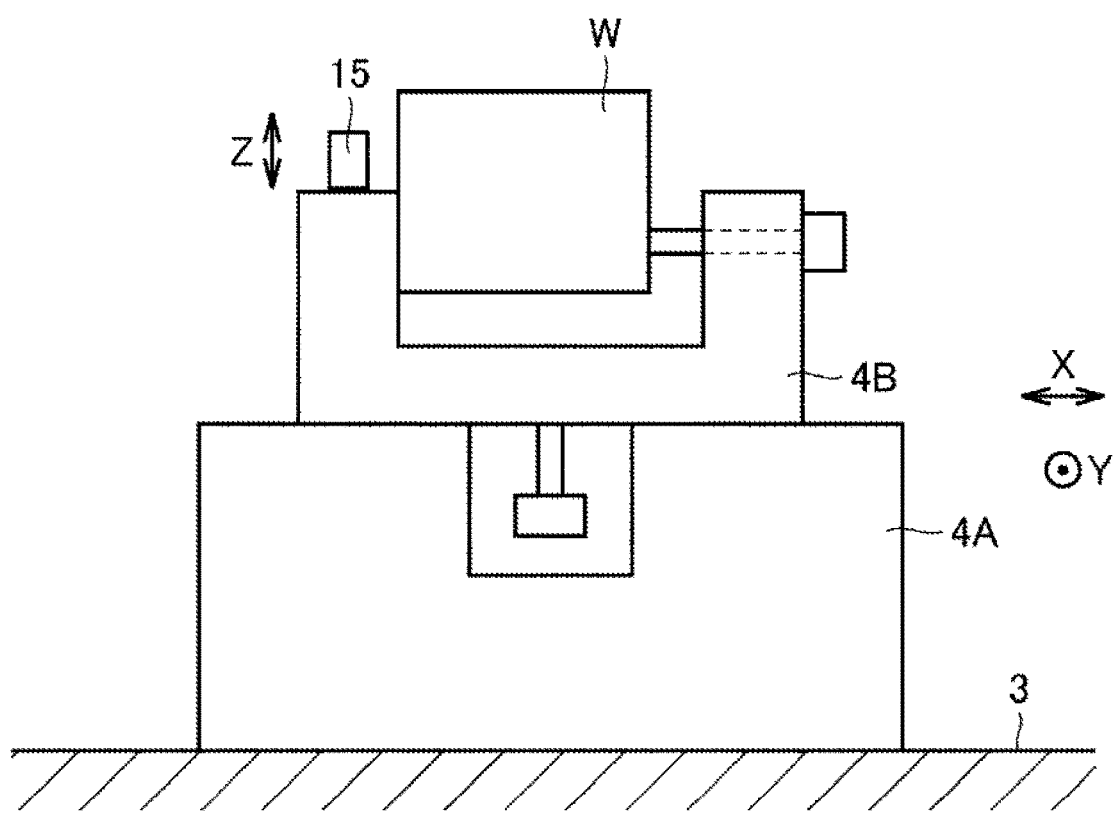
FIG. 2 is a diagram showing one example of a structure of a fixing jig shown in FIG. 1 and arrangement of the fixing jig and a sensor.

FIG. 2 is a diagram showing one example of a structure of the fixing jig 4 shown in FIG. 1 and arrangement of the fixing jig 4 and the sensor 15. As shown in FIG. 2, the fixing jig 4 is constituted by a first jig 4A that is fixed to the stage 3 and a second jig 4B that is fixed via the first jig 4A. The second jig 4B is fixed to the first jig 4A through vacuum suction, for example. The cutting object W is clamped to the second jig 4B, for example. Note that the configuration shown in FIG. 2 is one example for realizing a fixing method in a case in which the cutting object W is automatically replaced. Generally, a magnet chuck, a vise, etc., is used to fix a cutting object. Conventionally used fixing methods may also be used to fix the cutting object W.

Vibration occurs at the cutting object W during cutting processing of the cutting object W. The sensor 15 is preferably arranged as close as possible to the cutting object W. However, if the sensor 15 is arranged on a surface of the cutting object W, workability of the processing is reduced. From these viewpoints, the sensor 15 is arranged on the second jig 4B. The sensor 15 may also be arranged on the first jig 4A or the stage 3 so long as vibration can be detected.

Figure 3:
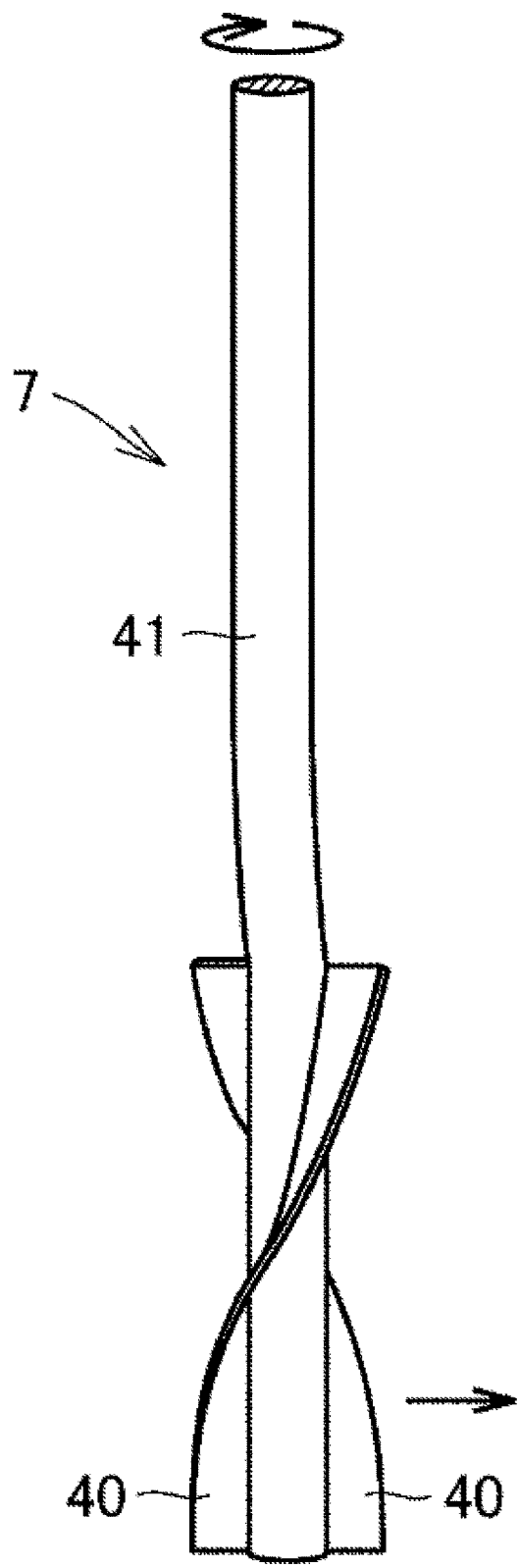
FIG. 3 is a diagram showing one example of a cutting tool.

FIG. 3 is a diagram showing one example of the cutting tool 7. As shown in FIG. 3, the cutting tool 7 is constituted by a shaft portion 41 and two (although there is no limitation to two) cutting edges 40 that are formed in a lower portion of the shaft portion 41 in the form of spiral blades.

Figure 4:
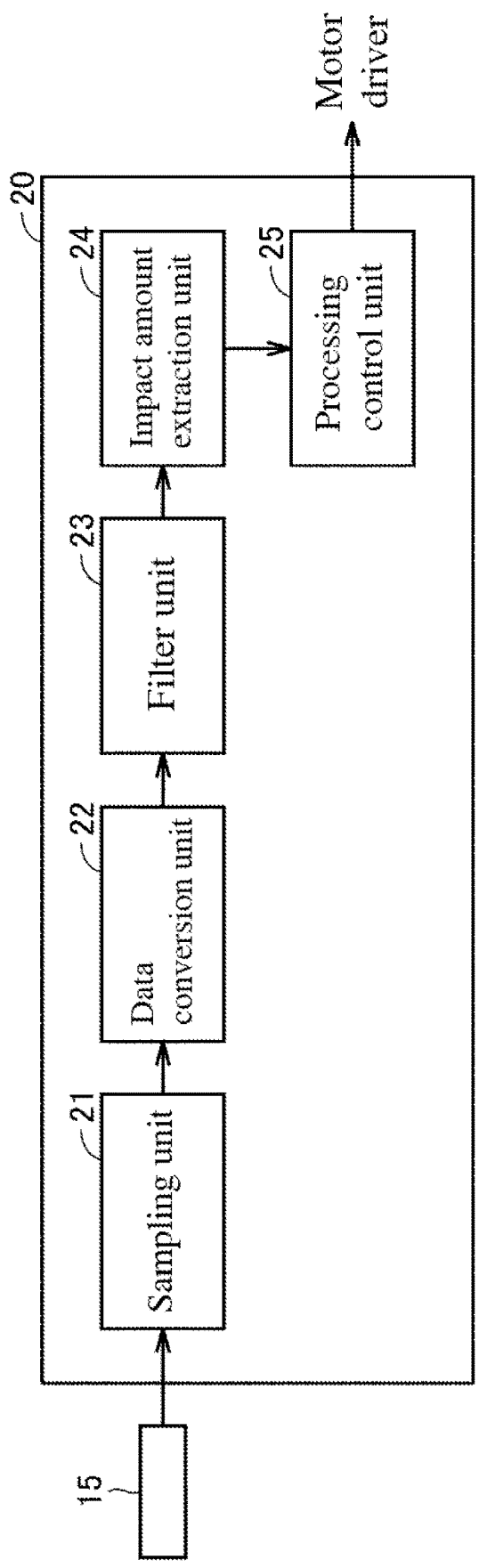
FIG. 4 is a block diagram showing a configuration of a control apparatus.

FIG. 4 is a block diagram showing a configuration of the control apparatus 20. The configuration shown in FIG. 4 can be realized using hardware, software, or both hardware and software. As shown in FIG. 4, the control apparatus 20 includes a sampling unit 21, a data conversion unit 22, a filter unit 23, an impact amount extraction unit 24, and a processing control unit 25.

The sampling unit 21 samples a monitoring signal output from the sensor 15, using a predetermined sampling frequency. The monitoring signal output from the sensor 15 is time waveform data. The data conversion unit 22 converts the time waveform data to frequency waveform data through Fourier transformation (e.g., fast Fourier transformation).

The filter unit 23 extracts waveform data in a frequency range from the frequency waveform data. In the present embodiment, whether to activate or inactivate the function of the filter unit 23 can be switched. Furthermore, the range (passing band) of frequencies that pass the filter unit 23 can be freely set.

The impact amount extraction unit 24 extracts, from the frequency waveform data, a vibration value at a processing frequency f that is determined from a product of the number N (rpm) of revolutions of the main shaft and the number M of cutting edges 40, as an impact amount. The processing frequency f can be expressed as $f = N/60 \times M$ (unit: Hz). The number N of revolutions of the main shaft is equal to the number of revolutions of the cutting tool 7. If the impact amount is to be extracted from across a frequency range, the impact amount extraction unit 24 measures the sum total (integral) of impact amounts in the frequency range.

The impact amount extraction unit 24 may also output the extracted impact amount to the outside. For example, a display unit (not shown) may display the value of the impact amount on a screen. In this case, a user can know the magnitude of the cutting resistance. For example, the user can determine whether or not the cutting tool 7 needs to be replaced.

The processing control unit 25 controls the apparatus main body 2 (see FIG. 1) based on the impact amount extracted by the impact amount extraction unit 24. The processing control unit 25 may control motor drivers for driving motors of the X axis feed mechanism 9 and the Y axis feed mechanism 10 based on the impact amount, for example. Thus, the processing speed of the cutting object W, in other words, the feeding speed of the cutting object W can be adjusted based on the impact amount. Namely, in the present embodiment, feedback control is performed on the processing speed of the cutting object W based on output of the sensor 15.

Figure 5:
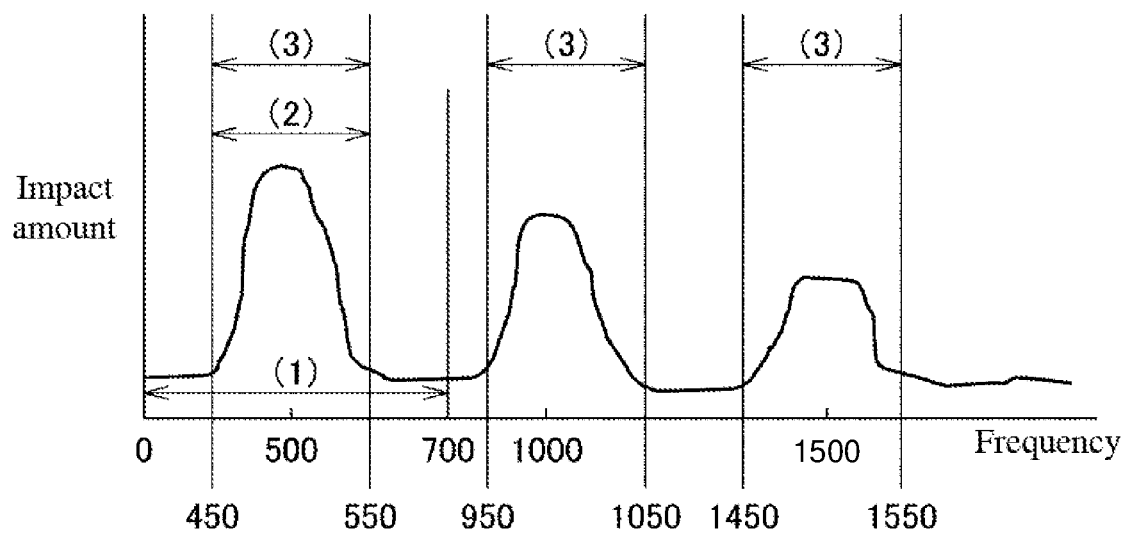
FIG. 5 is a schematic diagram for explaining extraction of an impact amount according to the present embodiment.

FIG. 5 is a schematic diagram for explaining extraction of the impact amount according to the present embodiment. As shown in FIG. 5, the control apparatus 20 may also extract the impact amount using a method selected from the following methods (1) to (3). (1) to (3) in FIG. 5 denote frequency ranges from which the impact amount is extracted using the following methods (1) to (3), respectively.

(1) The sum total of impact amounts at the processing frequency and frequencies near the processing frequency is measured. If the processing frequency is 500 Hz, for example, the sum total of impact amounts in a frequency range of 0 to 700 Hz is measured.

(2) The sum total of impact amounts in a frequency range that is set in consideration of fluctuation of the number of revolutions of the main shaft is measured. If the processing frequency is 500 Hz, for example, the sum total of impact amounts in a frequency range of 450 to 550 Hz is measured, for example. Note that the processing frequency need not necessarily have to be the center frequency of the above-described frequency range, and lower and upper limits of the frequency range can be determined independently of each other.

(3) The sum total of impact amounts in a frequency range that is set in consideration of fluctuation of the number of revolutions of the main shaft and the sum total of impact amounts at frequencies that are multiples of the processing frequency are measured. If the processing frequency is 500 Hz, for example, the sum total of impact amounts in frequency ranges of 450 to 550 Hz, 950 to 1050 Hz, and 1450 to 1550 Hz is measured.

In the processing apparatus disclosed in JP 2014-14914A, a sensor is arranged in contact with an upper surface of a main shaft support portion and a side surface of a main shaft motor. This means that, in the configuration shown in FIG. 1, the sensor 15 is arranged close to the main shaft motor 8 on a surface of the main shaft support portion 5. In such a case, the sensor 15 detects vibration of the main shaft motor in addition to vibration of the main shaft, and accordingly a monitoring signal output from the sensor 15 includes components of vibration of the main shaft motor and vibration of the main shaft. Therefore, even if the monitoring signal is extracted using the above-described processing frequency f (frequency determined from the number N of revolutions of the main shaft and the number M of cutting edges of the cutting tool 7), the extracted value includes components of both vibration of the main shaft motor and vibration of the main shaft. Namely, it is difficult to extract only the impact amount of the cutting tool 7. In particular, if the material of the cutting object W is a metal, such as aluminum or copper, that has a lower degree of hardness than iron, vibration of the main shaft transmitted to the main shaft support portion 5 is likely to be small. This makes it more difficult to extract only the impact amount of the cutting tool 7.

Furthermore, in the case of the processing apparatus disclosed in JP 2014-14914A, if the number of revolutions of the main shaft fluctuates, a measured value of the impact amount is smaller than an actual value of the impact amount. Therefore, it is not possible to stably measure the impact amount while coping with fluctuation of the number of revolutions of the main shaft.

In contrast, according to the embodiment of the present invention, the sensor 15 is arranged at a position that is closer to the cutting object, and therefore effects of vibration of the main shaft motor 8 are reduced when vibration is detected using the sensor 15. If the monitoring signal is extracted using the processing frequency determined based on a product of the number N of revolutions of the main shaft and the number M of cutting edges of the cutting tool 7, the impact amount of the cutting tool 7 can be extracted. Furthermore, according to the embodiment of the present invention, it is possible to stably measure the impact amount while coping with fluctuation of the number of revolutions of the main shaft (number of revolutions of the main shaft motor 8) by using the above-described method (1), (2), or (3). As a result, processing resistance can be stably measured.

Table 1 shows values of Vickers hardness of samples that were used in an experiment of cutting processing according to the present disclosure. The samples used in the experiment were made of brass. Ordinary brass has a Vickers hardness of about HV50 to 100. The hardness was measured at three measurement positions for each of the three samples (Sample No. 1 to 3). An average value of the hardness measured at the nine measurement positions was 101.5. As described above, SS400 has a Vickers hardness of about HV120 to 140. Therefore, the measurement result shows that brass is a material having a lower degree of hardness than stainless steel.

TABLE 1

| Sample No. | Measurement position | HV |
|---|---|---|
| 1 | 1 | 105.3 |
|   | 2 | 105.9 |
|   | 3 | 106.1 |
| 2 | 1 | 96.9 |
|   | 2 | 98.2 |
|   | 3 | 97.6 |
| 3 | 1 | 102.4 |
|   | 2 | 100.7 |
|   | 3 | 100.0 |

FIG. 6 is a diagram showing a table that shows a measurement result of the impact amount in a case in which the sensor 15 was arranged in contact with an upper surface of the main shaft support portion and a side surface of the main shaft motor. As shown in FIG. 6, the sensor 15 was arranged on a main shaft bottom surface. At this time, a distance from a processing point to the sensor 15 was 300 mm. The processing frequency was 1670 Hz (N=50000 rpm, M=2), but a vibration waveform could not be measured at the processing frequency. On the other hand, vibration was detected (vibration strength=1000) at a vibration frequency of 820 Hz. This vibration is supposed to be caused by revolutions (50000 rpm=830 Hz) of the main shaft motor.

Figure 7:
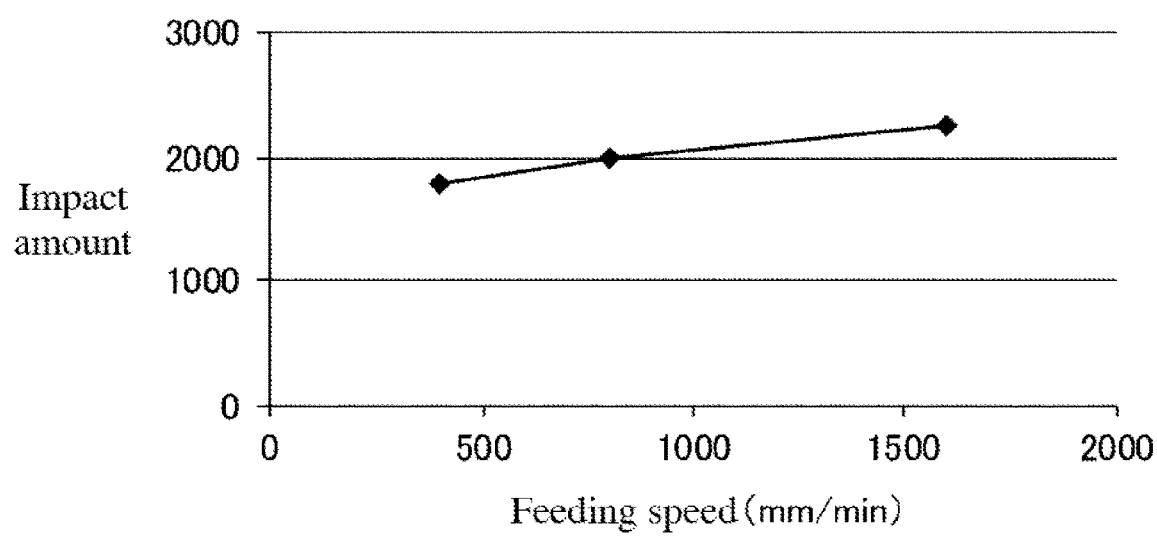
FIG. 7 is a diagram showing a measurement result of an impact amount in a case in which a sensor is arranged on a surface of the fixing jig according to the present embodiment.

FIG. 7 is a diagram showing a measurement result of the impact amount in a case in which the sensor 15 was arranged on a surface of the fixing jig 4 according to the present embodiment. As shown in FIG. 7, a significant impact amount could be measured at the processing frequency of 1670 Hz. Furthermore, it can be found that the impact amount increased as the feeding speed was increased. The relationship between the feeding speed and the impact amount shown in FIG. 7 indicates that the processing resistance increases if the feeding speed is increased.

Figure 8:
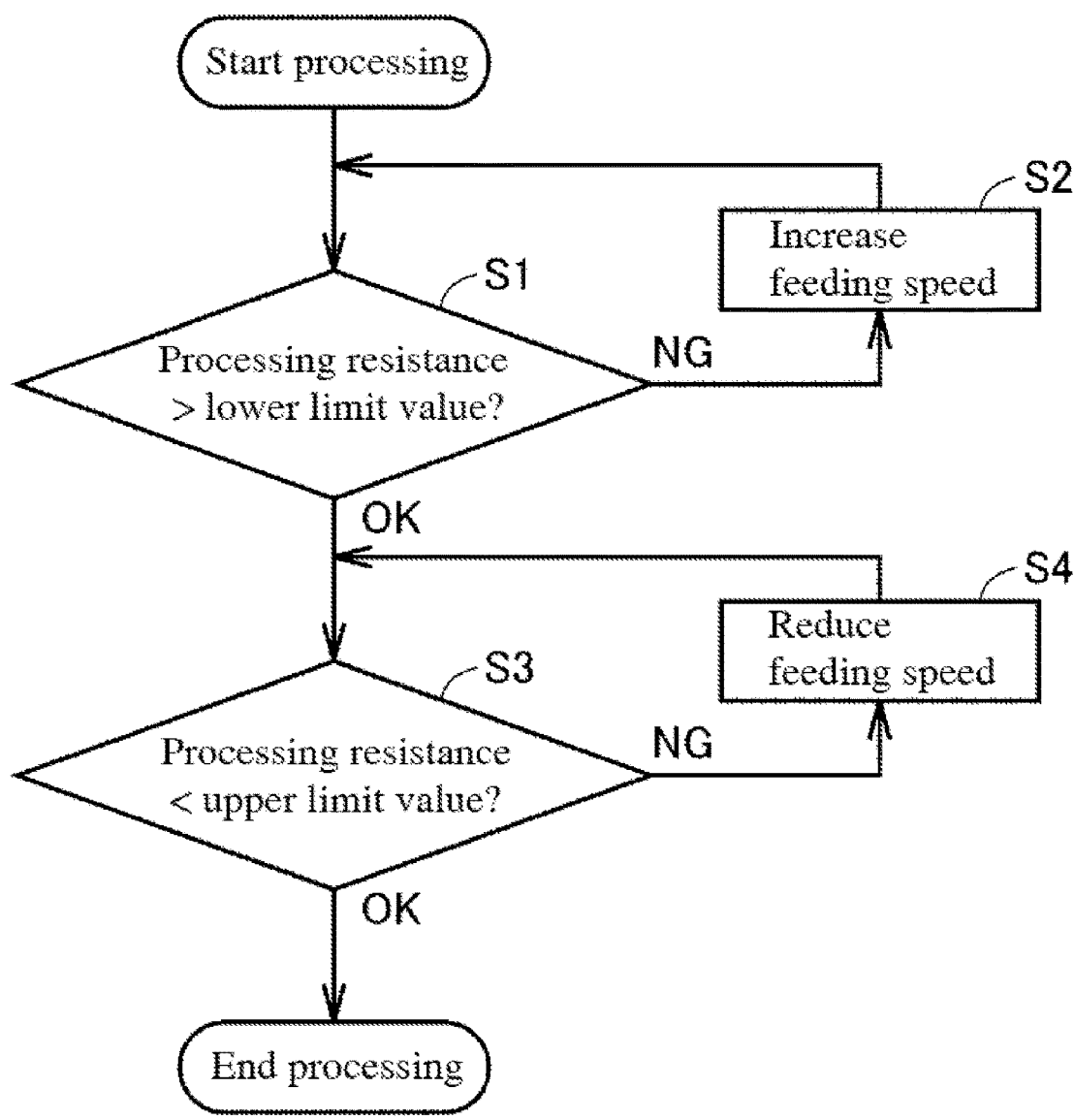
FIG. 8 is a flow chart for showing one example of a processing method according to the present embodiment.

FIG. 8 is a flow chart for showing one example of a processing method according to the present embodiment. The process shown in this flow chart is executed by the control apparatus 20. Cutting processing is started, and it is determined in step S1 whether the processing resistance is larger than a predetermined lower limit value. The processing resistance can be calculated from a predetermined correlation between the impact amount and the processing resistance based on a measured impact amount. In step S1, an impact amount measured using a method according to the present embodiment may also be compared to a reference value.

If the processing resistance is larger than the lower limit value, the cutting processing is appropriately executed ("OK"). In this case, the process advances to step S3. If the processing resistance is lower than the lower limit value ("NG"), the control apparatus 20 increases the feeding speed of the cutting tool 7 in step S2. As a result, the processing resistance increases.

In step S3, it is determined whether the processing resistance is smaller than a predetermined upper limit value. If the processing resistance is not larger than the predetermined upper limit value, the cutting processing is appropriately executed ("OK"). Therefore, the cutting tool 7 is fed at the current feeding speed, and the cutting processing ends. In contrast, if the processing resistance is larger than the predetermined upper limit value, the control apparatus 20 reduces the feeding speed of the cutting tool 7 in step S4. As a result, the processing resistance decreases.

As described above, according to the present embodiment, the processing speed can be controlled such that the processing resistance takes on an appropriate value. Therefore, the cutting processing can be precisely and efficiently performed.

The cutting processing apparatus according to the present embodiment is not limited to the configuration shown in FIG. 1. In particular, the control apparatus 20 need not necessarily have to be constituted by a single apparatus. Also, the control apparatus 20 need not necessarily have to be installed in the apparatus main body 2.

Figure 9:
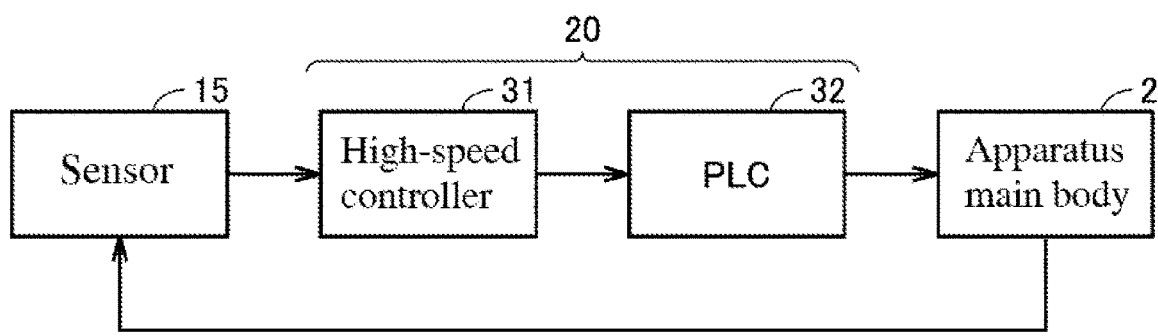
FIG. 9 is a block diagram showing another example of a configuration of the cutting processing apparatus according to the present embodiment.

FIG. 9 is a block diagram showing another example of the configuration of the cutting processing apparatus according to the present embodiment. As shown in FIG. 9, the control apparatus 20 may also be constituted by a high-speed controller 31 and a PLC (Programmable Logic Controller). The high-speed controller 31 samples a monitoring signal output from the sensor 15 and creates vibration waveform data. The PLC 32 creates frequency waveform data through Fourier transformation (frequency analysis) and calculates a processing resistance value from the frequency waveform data. Then, the PLC 32 computes an optimum feeding speed of the cutting tool 7 from the processing resistance value. The apparatus main body 2 cuts the cutting object by moving the cutting tool 7 at the optimum feeding speed designated by the PLC 32. The sensor 15 detects vibration during cutting processing. Accordingly, feedback control is performed based on output of the sensor 15.

Functions and Effects

As described above, according to the present embodiment, it is possible to detect only a monitoring signal for obtaining an impact amount of the cutting tool 7 using the sensor 15. The detection performed using the sensor 15 is unlikely to be affected by the material of the cutting object. Therefore, even when a cutting object made of a material having a lower degree of hardness than stainless steel is cut, an impact amount correlating with the processing resistance can be extracted from a signal output from the sensor 15. As a result, the processing resistance can be more accurately grasped. Furthermore, the control apparatus 20 controls the apparatus main body 2 based on the processing resistance. Therefore, the cutting object W can be precisely processed based on the measured processing resistance.

Supplementary Notes

As described above, the present embodiment includes the disclosures listed below.

1. A cutting processing apparatus (1) including a cutting tool (7) for cutting a cutting object (W) that is made of a material having a lower degree of hardness than stainless steel, a chuck portion (6) configured to hold the cutting tool (7) and be rotationally driven, a fixing portion (4) configured to fix the cutting object (W), a stage (3) configured to move the fixing portion (4) at a processing speed in a direction that is substantially orthogonal to a rotation axis (6A) of the chuck portion (6), a sensor (15) that is arranged in the vicinity of a position on the fixing portion (3) at which the cutting object (W) is to be fixed, and configured to detect vibration of the cutting tool (7) during cutting processing of the cutting object (W) and output a monitoring signal, and a control circuit (20) configured to convert time waveform data of the monitoring signal to frequency waveform data and extract an impact amount during cutting processing of the cutting object (W) from the frequency waveform data.

2. The cutting processing apparatus (1) according to Supplementary Note 1, wherein the sensor (15) is arranged such that a detection direction matches a direction in which the largest cutting resistance occurs.

3. The cutting processing apparatus (1) according to Supplementary Note 1 or 2, wherein the cutting tool (7) includes a plurality of cutting edges (40), and the control circuit (20) extracts the sum total of impact amounts in a frequency range that includes a processing frequency that is determined from a product of the number of revolutions of the cutting tool (7) and the number of cutting edges (40).

4. The cutting processing apparatus (1) according to Supplementary Note 1 or 2, wherein the cutting tool (7) includes a plurality of cutting edges (40), and the control circuit (20) extracts the sum total of impact amounts in a frequency range that includes a processing frequency and is set in consideration of fluctuation of the number of revolutions of the cutting tool, the processing frequency being determined from a product of the number of revolutions of the cutting tool and the number of cutting edges (40).

5. The cutting processing apparatus (1) according to Supplementary Note 1 or 2, wherein the cutting tool (7) includes a plurality of cutting edges (40), and the control circuit (20) extracts the sum total of impact amounts at a processing frequency and frequencies that are multiples of the processing frequency, the processing frequency being determined from a product of the number of revolutions of the cutting tool and the number of cutting edges (40).

6. The cutting processing apparatus (1) according to any one of Supplementary Notes 1 to 5, wherein the control circuit (20) is configured to control the processing speed of the cutting object (W) based on the impact amount.

The embodiment disclosed herein is considered in all respects to be illustrative and not restrictive. The scope of the present invention is indicated by the claims rather than by the foregoing description, and all changes that come within the meaning and range of equivalency of the claims are intended to be encompassed therein.

INDEX TO THE REFERENCE NUMERALS

1 . . . cutting processing apparatus, 2 . . . apparatus main body, 3 . . . stage, 4 . . . fixing jig, 4A . . . first jig, 4B . . . second jig, 5 . . . main shaft support portion, 6 . . . chuck portion, 6A . . . rotation axis, 7 . . . cutting tool, 8 . . . main shaft motor, 9 . . . X axis feed mechanism, 10 . . . Y axis feed mechanism, 11 . . . Z axis feed mechanism, 15 . . . sensor, 20 . . . control apparatus, 21 . . . sampling unit, 22 . . . data conversion unit, 23 . . . filter unit, 24 . . . impact amount extraction unit, 25 . . . processing control unit, 31 . . . high-speed controller, 32 . . . PLC, 40 . . . cutting edge, 41 . . . shaft portion, S1 to S4 . . . step, W . . . cutting object

The invention claimed is:

1. A cutting processing apparatus comprising:
a cutting tool for cutting a cutting object that is made of a material having a lower degree of hardness than stainless steel;
a chuck portion configured to hold the cutting tool and be rotationally driven;
a fixing portion comprising a jig configured to fix the cutting object;
a stage configured to move the fixing portion at a processing speed in a direction that is substantially orthogonal to a rotation axis of the chuck portion;
a sensor that is arranged on the fixing portion in the vicinity of a position on the fixing portion at which the cutting object is to be fixed, and configured to detect vibration of the cutting tool during cutting processing of the cutting object and output a monitoring signal, the sensor is arranged such that a detection direction of the sensor matches a direction in which a largest cutting resistance occurs; and
a control circuit configured to convert time waveform data of the monitoring signal to frequency waveform data and extract an impact amount during cutting processing of the cutting object from the frequency waveform data,
wherein the control circuit extracts the impact amount using a method selected from (1) extracting the sum total of impact amounts in a frequency range that comprises a processing frequency that is determined from a product of the number of revolutions of the cutting tool and the number of cutting edges, (2) extracting the sum total of impact amounts in a frequency range that comprises a processing frequency and is set in consideration of fluctuation of the number of revolutions of the cutting tool, the processing frequency being determined from a product of the number of revolutions of the cutting tool and the number of cutting edges, and (3) extracting the sum total of impact amounts at a processing frequency and frequencies that are multiples of the processing frequency, the processing frequency being determined from a product of the number of revolutions of the cutting tool and the number of cutting edges.

2. The cutting processing apparatus according to claim 1, wherein the cutting tool comprises a plurality of cutting edges, and
the control circuit extracts the sum total of impact amounts in a frequency range that comprises a processing frequency that is determined from a product of the number of revolutions of the cutting tool and the number of cutting edges.

3. The cutting processing apparatus according to claim 2, wherein the control circuit is configured to control the processing speed of the cutting object based on the impact amount.

4. The cutting processing apparatus according to claim 1, wherein the cutting tool comprises a plurality of cutting edges, and
the control circuit extracts the sum total of impact amounts in a frequency range that comprises a processing frequency and is set in consideration of fluctuation of the number of revolutions of the cutting tool, the processing frequency being determined from a product of the number of revolutions of the cutting tool and the number of cutting edges.

5. The cutting processing apparatus according to claim 4, wherein the control circuit is configured to control the processing speed of the cutting object based on the impact amount.

6. The cutting processing apparatus according to claim 1, wherein the cutting tool comprises a plurality of cutting edges, and
the control circuit extracts the sum total of impact amounts at a processing frequency and frequencies that are multiples of the processing frequency, the processing frequency being determined from a product of the number of revolutions of the cutting tool and the number of cutting edges.

7. The cutting processing apparatus according to claim 6, wherein the control circuit is configured to control the processing speed of the cutting object based on the impact amount.

8. The cutting processing apparatus according to claim 1, wherein the control circuit is configured to control the processing speed of the cutting object based on the impact amount.

9. The cutting processing apparatus according to claim 1, wherein the cutting tool comprises a plurality of cutting edges, and
the control circuit extracts the sum total of impact amounts in a frequency range that comprises a processing frequency that is determined from a product of the number of revolutions of the cutting tool and the number of cutting edges.

10. The cutting processing apparatus according to claim 1, wherein the cutting tool comprises a plurality of cutting edges, and
the control circuit extracts the sum total of impact amounts in a frequency range that comprises a processing frequency and is set in consideration of fluctuation of the number of revolutions of the cutting tool, the processing frequency being determined from a product of the number of revolutions of the cutting tool and the number of cutting edges.

11. The cutting processing apparatus according to claim 1, wherein the cutting tool comprises a plurality of cutting edges, and
the control circuit extracts the sum total of impact amounts at a processing frequency and frequencies that are multiples of the processing frequency, the processing frequency being determined from a product of the number of revolutions of the cutting tool and the number of cutting edges.

12. The cutting processing apparatus according to claim 1, wherein the control circuit is configured to control the processing speed of the cutting object based on the impact amount.

* * * * *